(12) United States Patent
Voss et al.

(10) Patent No.: US 11,460,991 B2
(45) Date of Patent: Oct. 4, 2022

(54) PRIORITIZING DISPLAY OF USER ICONS ASSOCIATED WITH CONTENT

(71) Applicant: Snap Inc., Santa Monica, CA (US)

(72) Inventors: Jeremy Voss, Los Angeles, CA (US); Christie Marie Heikkinen, Santa Monica, CA (US); Daniel Rakhamimov, Brooklyn, NY (US); Laurent Desserrey, Los Angeles, CA (US); Susan Marie Territo, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/193,836

(22) Filed: Mar. 5, 2021

(65) Prior Publication Data

US 2021/0303139 A1    Sep. 30, 2021

Related U.S. Application Data

(63) Continuation of application No. 16/730,294, filed on Dec. 30, 2019, now Pat. No. 10,963,145.

(51) Int. Cl.
*G06F 3/048* (2013.01)
*G06F 3/04845* (2022.01)
*G06F 3/0482* (2013.01)
*G06F 9/54* (2006.01)
(Continued)

(52) U.S. Cl.
CPC ........ *G06F 3/04845* (2013.01); *G06F 3/0482* (2013.01); *G06F 3/04817* (2013.01); *G06F 9/542* (2013.01); *H04L 51/224* (2022.05)

(58) Field of Classification Search
CPC ............. G06F 3/04845; G06F 3/04817; G06F 3/0482; G06F 9/542; H04L 51/24
See application file for complete search history.

(56) References Cited

U.S. PATENT DOCUMENTS

| 9,230,355 | B1 | 1/2016 | Ahuja et al. |
| 9,270,628 | B2* | 2/2016 | Shia ........................ G06Q 10/10 |
| 10,438,214 | B1* | 10/2019 | Kim ........................ G06Q 30/02 |

(Continued)

OTHER PUBLICATIONS

U.S. Appl. No. 16/730,294, filed Dec. 30, 2019, Prioritizing Display of User Icons Associated With Content.
(Continued)

*Primary Examiner* — David Phantana-angkool
(74) *Attorney, Agent, or Firm* — Schwegman Lundberg & Woessner, P.A.

(57) ABSTRACT

Aspects of the present disclosure involve a system comprising a computer-readable storage medium storing a program and method for prioritizing display of an icon representing a user with available content. The program and method provide for determining a display order for multiple icons, each icon corresponding to a user of a messaging application having a content collection available for display; receiving, from a device, an indication to prioritize display of a selected icon of the multiple icons relative to other icons of the multiple icons; updating, in response to receiving the indication, the display order to prioritize display of the selected icon relative to the other icons; and providing, to the device, an indication of the updated display order to cause the multiple icons to be displayed according to the updated display order.

20 Claims, 15 Drawing Sheets

(51) Int. Cl.
   *G06F 3/04817*  (2022.01)
   *H04L 51/224*   (2022.01)

(56) References Cited

U.S. PATENT DOCUMENTS

| | | | |
|---|---|---|---|
| 10,516,851 B1 | 12/2019 | Eirinberg et al. | |
| 10,599,289 B1 | 3/2020 | Voss et al. | |
| 10,617,949 B1 | 4/2020 | Paul | |
| 10,679,389 B2 | 6/2020 | Allen et al. | |
| 10,685,072 B2 | 6/2020 | Rubin et al. | |
| 10,963,145 B1* | 3/2021 | Voss | G06F 3/0488 |
| 11,140,257 B1* | 10/2021 | Voss | H04L 51/32 |
| 11,165,734 B1* | 11/2021 | Desserrey | G06F 3/04842 |
| 11,221,751 B2* | 1/2022 | Chaudhri | G06F 3/0485 |
| 11,245,658 B2* | 2/2022 | Grantham | H04L 51/046 |
| 11,297,025 B2* | 4/2022 | Lee | G06F 9/542 |
| 2012/0110096 A1 | 5/2012 | Smarr et al. | |
| 2017/0093777 A1* | 3/2017 | Neustifter | H04L 67/22 |
| 2017/0109013 A1* | 4/2017 | Hong | H04L 51/04 |
| 2018/0350144 A1 | 12/2018 | Rathod | |
| 2018/0351895 A1 | 12/2018 | Rathod | |
| 2018/0367483 A1* | 12/2018 | Rodriguez | H04L 51/04 |
| 2019/0266031 A1 | 8/2019 | Wu et al. | |
| 2020/0004829 A1 | 1/2020 | Denton et al. | |
| 2020/0028815 A1 | 1/2020 | He et al. | |
| 2020/0104020 A1 | 4/2020 | Grantham et al. | |
| 2020/0106728 A1 | 4/2020 | Grantham et al. | |
| 2020/0186489 A1* | 6/2020 | Chen | G06F 40/186 |
| 2020/0274841 A1* | 8/2020 | Lee | H04L 51/04 |
| 2021/0306288 A1* | 9/2021 | Boyd | H04L 51/046 |
| 2021/0407165 A1* | 12/2021 | Bentell | G06T 13/80 |

OTHER PUBLICATIONS

"U.S. Appl. No. 16/730,294, Examiner Interview Summary dated Nov. 13, 2020", 2 pgs.

"U.S. Appl. No. 16/730,294, Non Final Office Action dated Jun. 25, 2020", 8 pgs.

"U.S. Appl. No. 16/730,294, Notice of Allowance dated Nov. 20, 2020", 5 pgs.

"U.S. Appl. No. 16/730,294, Response filed Oct. 26, 20 to Non Final Office Action dated Jun. 25, 2020", 8 pgs.

* cited by examiner

PRIORITIZING DISPLAY OF USER ICONS ASSOCIATED WITH CONTENT

CROSS-REFERENCE TO RELATED APPLICATION

This application is a continuation of U.S. patent application Ser. No. 16/730,294, filed Dec. 30, 2019, which is incorporated by reference herein in its entirety.

TECHNICAL FIELD

The present disclosure relates generally to messaging systems, including configuring messaging systems to prioritize display of user icons associated with available content.

BACKGROUND

Messaging systems provide for the exchange of message content between users. For example, a messaging system allows a user to exchange message content with one or more other users in a message thread.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A messaging system may provide for an end user to access content collections (e.g., "Stories") made available by other users. For example, the other users may correspond to contacts (e.g., friends) of the end user. A messaging system may work in conjunction with a social network system which is configured to maintain the identity of users and their corresponding relationships.

The messaging system determines a display order for listing the users (e.g., or icons representing the users) within a feed interface. Selection of a listed user in the feed interface results in displaying the respective content collection for the selected user. However, in some cases, an end user may wish to more quickly and/or more easily access the content collection (e.g., a Story) or other content (e.g., message content) for the selected user.

The disclosed embodiments provide for improved access to a content collection associated with a user. In a case where multiple users with available content collections are displayed (e.g., as a list of respective user icons), an end user can select a particular user icon for which display is to be prioritized (e.g., by pinning the user icon). Selection of the user icon provides for access to the associated content collection (e.g., Story) or other available content (e.g., message content).

Display of the selected user icon may be prioritized in one or more manners. For example, a display order of the list is updated by positioning the selected icon at the top of the list. The updated display order may persist over subsequent instantiations of the messaging application, such that the selected user continues to appear on the top of the list. Alternatively, or in addition, prioritized display of the selected icon corresponds to displaying the icon (e.g., or other representation of the user) on a device lock screen on a persistent basis. By virtue of the prioritized display, access to the content (e.g., Story and/or message content) for a particular user is facilitated, thereby improving the end user's experience.

Figure 1:
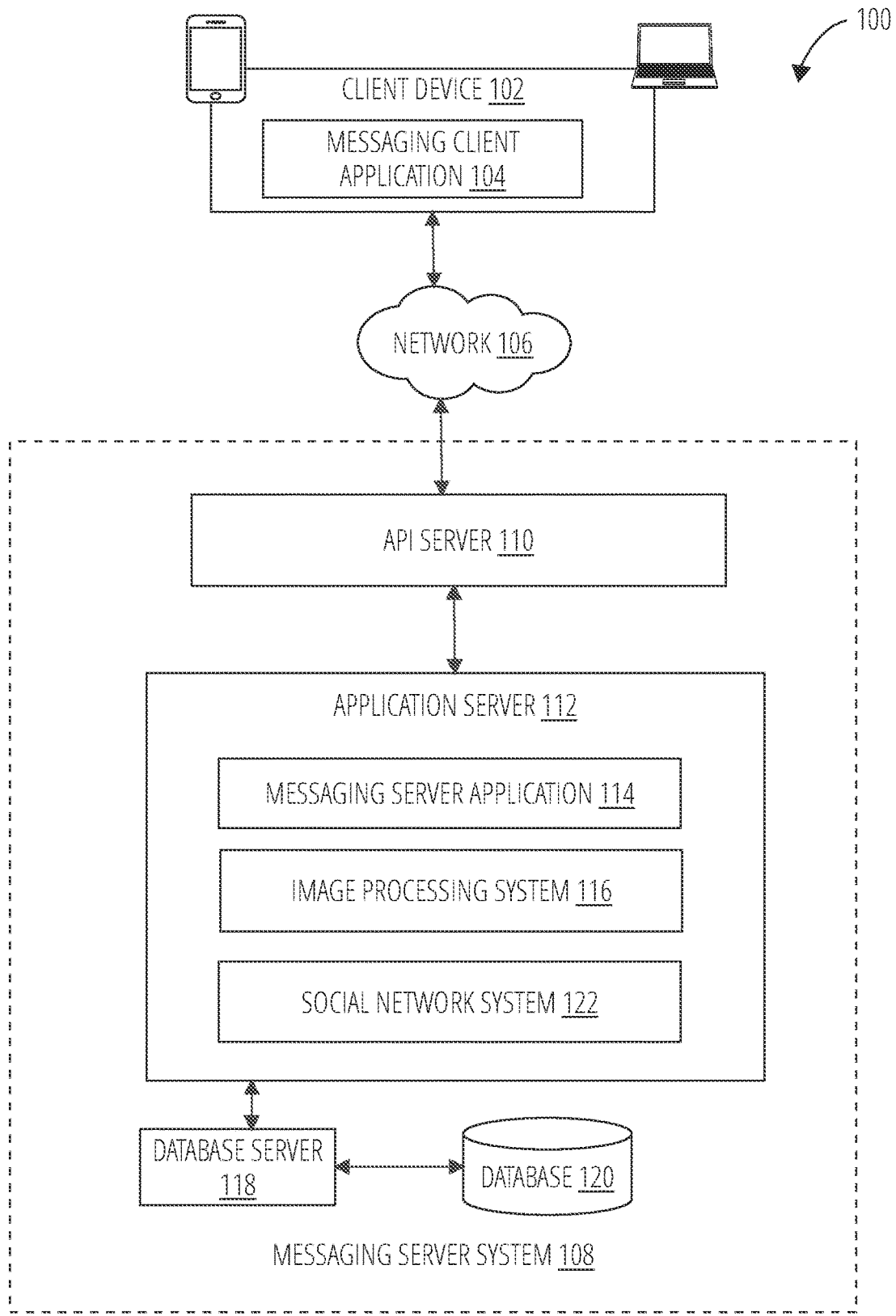
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between the messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., Story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into content collections (e.g., called Stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
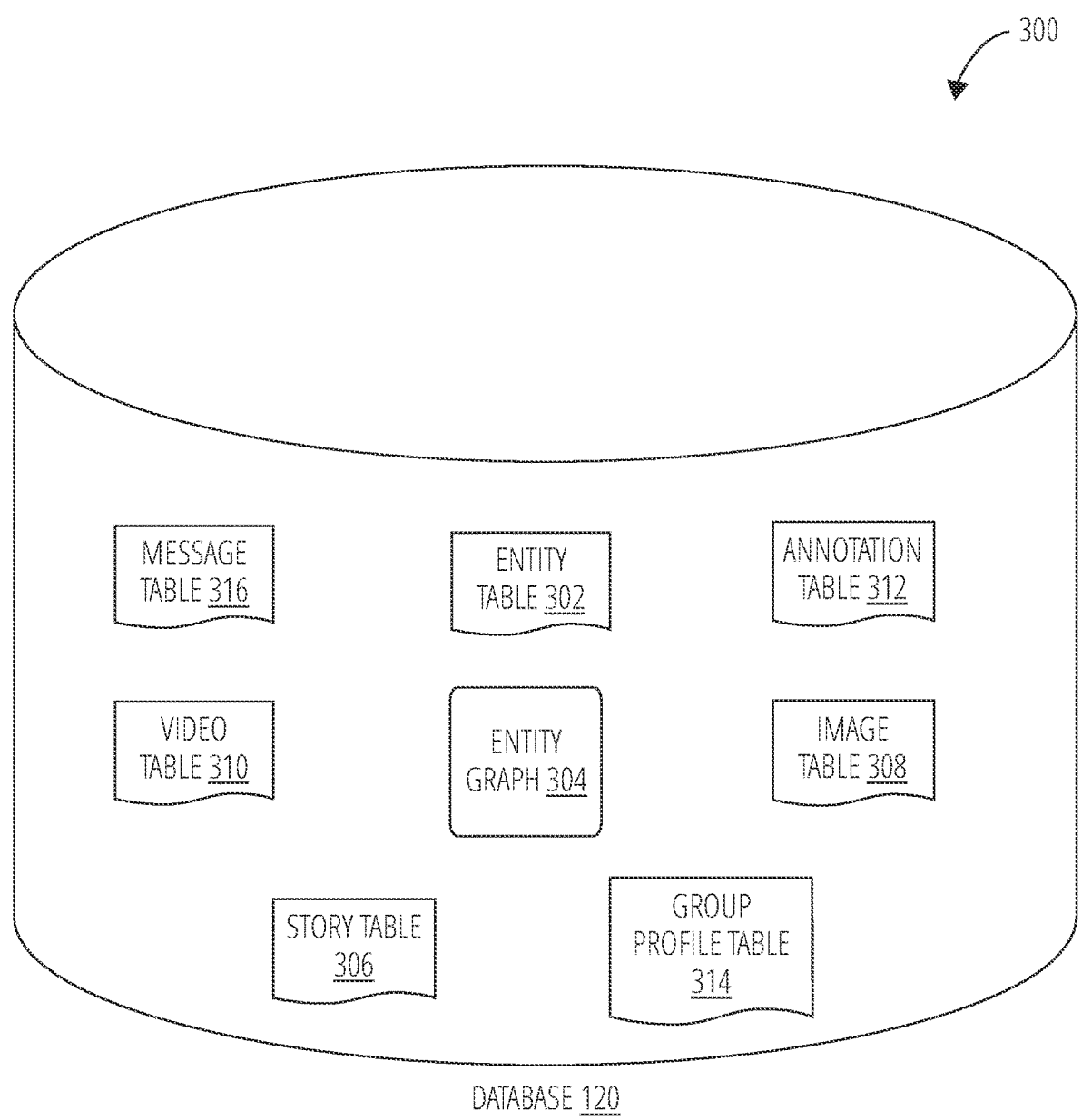
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user. Such other users may be referred to as the user's friends. In some embodiments, the social network system 122 may access location information associated with each of the user's friends to determine where they live or are currently located geographically.

Figure 2:
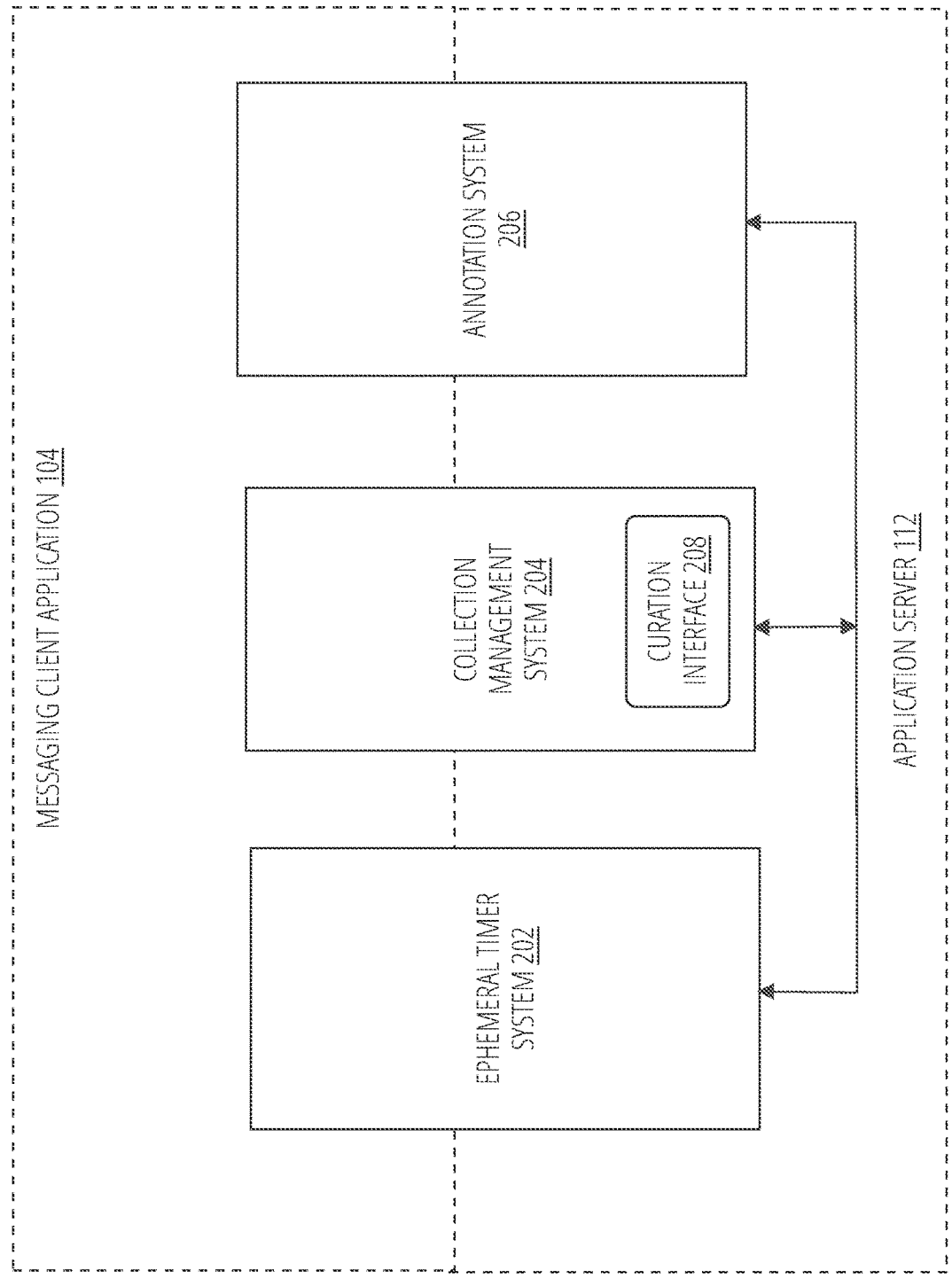
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a Story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular content collection. For example, the curation interface 208 enables an event organizer to curate a content collection relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 316. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "Lenses" data. A "Lenses" may be a real-time special effect and sound that may be added to an image or a video.

As mentioned above, the video table 310 stores video data which, in one embodiment, is associated with messages for which records are maintained within the message table 316. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., each user for which a record is maintained in the entity table 302). A user may create a "personal Story" in the form of a content collection that has been created and sent/broadcast by that user. To this end, the user interface of the messaging client application 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a created stream of user-submitted content from varies locations and events. Users whose client devices have location services enabled and are at a common location event at a particular time may, for example, be presented with an option, via a user interface of the messaging client application 104, to contribute content to a particular live Story. The live Story may be identified to the user by the messaging client application 104, based on his or her location. The end result is a "live Story" told from a community perspective.

A further type of content collection is known as a "location Story", which enables a user whose client device 102 is located within a specific geographic location (e.g., on a college or university campus) to contribute to a particular collection. In some embodiments, a contribution to a location Story may require a second degree of authentication to verify that the end user belongs to a specific organization or other entity (e.g., is a student on the university campus).

A group profile table 314 stores data regarding group profiles, where a group profile includes saved information that is common to a group of at least two users (e.g., and where a group profile for two users may also be referred to as a friendship profile). Such information may include message content, such as but not limited to, images, videos, audio files, attachments, and messages (e.g., text-based messages), with any corresponding annotation data, exchanged within one or more message thread(s) with respect to a group of users. The saved information included within a group profile may further include shared settings that apply to the group, such that an update to a shared setting by one group user applies to all users within the group. The group profile (e.g., or friendship profile) may further provide for access to one or more content collections (e.g., Stories) associated with the group/friend.

In some embodiments, messages, images, videos and/or attachments may be added to the group profile in response to a specific request from one of the users in the group. For example, if the users in the group exchange message content (e.g., messages, images, videos and/or attachments), all of the message content, by default, may typically be automatically deleted and removed from storage after a specified time period (e.g., one hour, one minute, one second, etc.). However, if prior to the specified time period when the message content is automatically deleted, one of the users in the group selects certain message content (e.g., one or more messages, images, videos and/or attachments) for permanent retention (e.g., via a "save" interface), the selected message content is added to the group profile. The saved message content may be viewed by any one of the users in the group at any given time.

Figure 4:
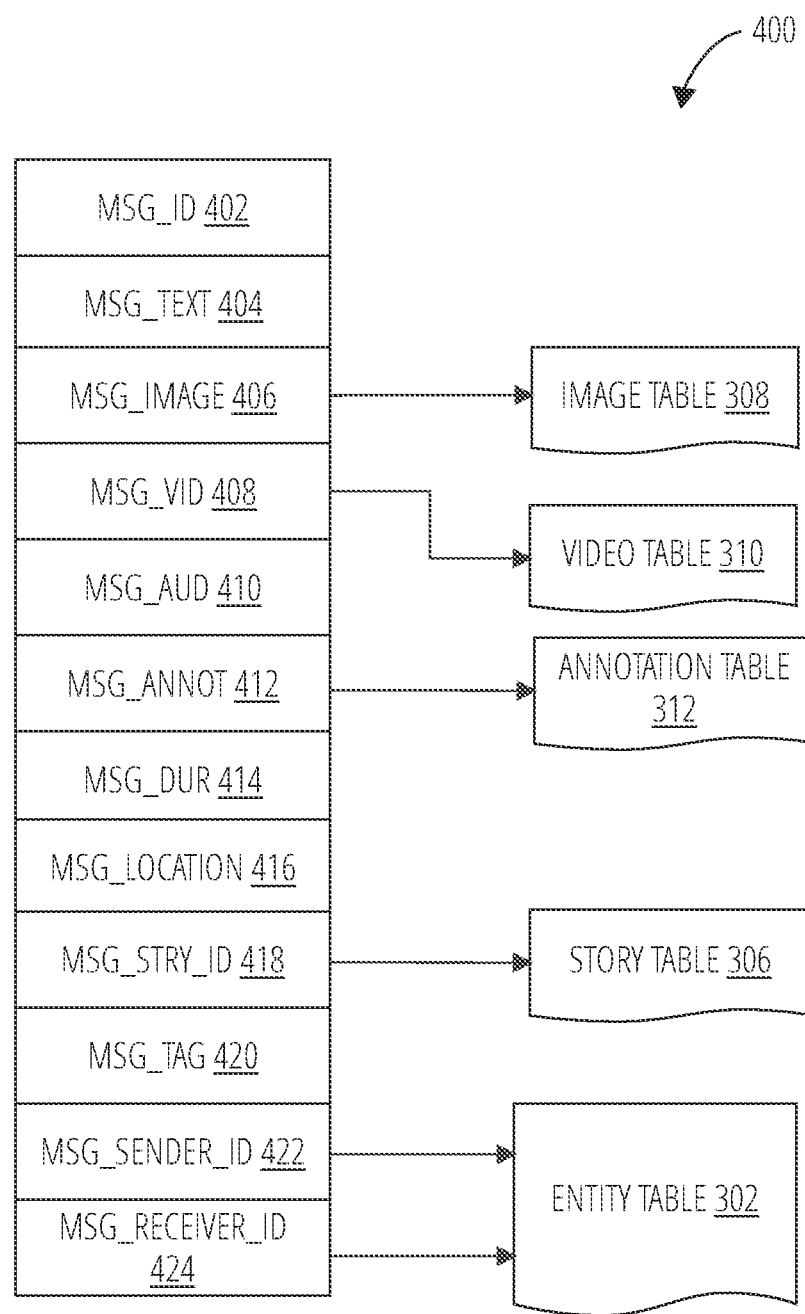
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 316 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

Message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "Stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102, to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
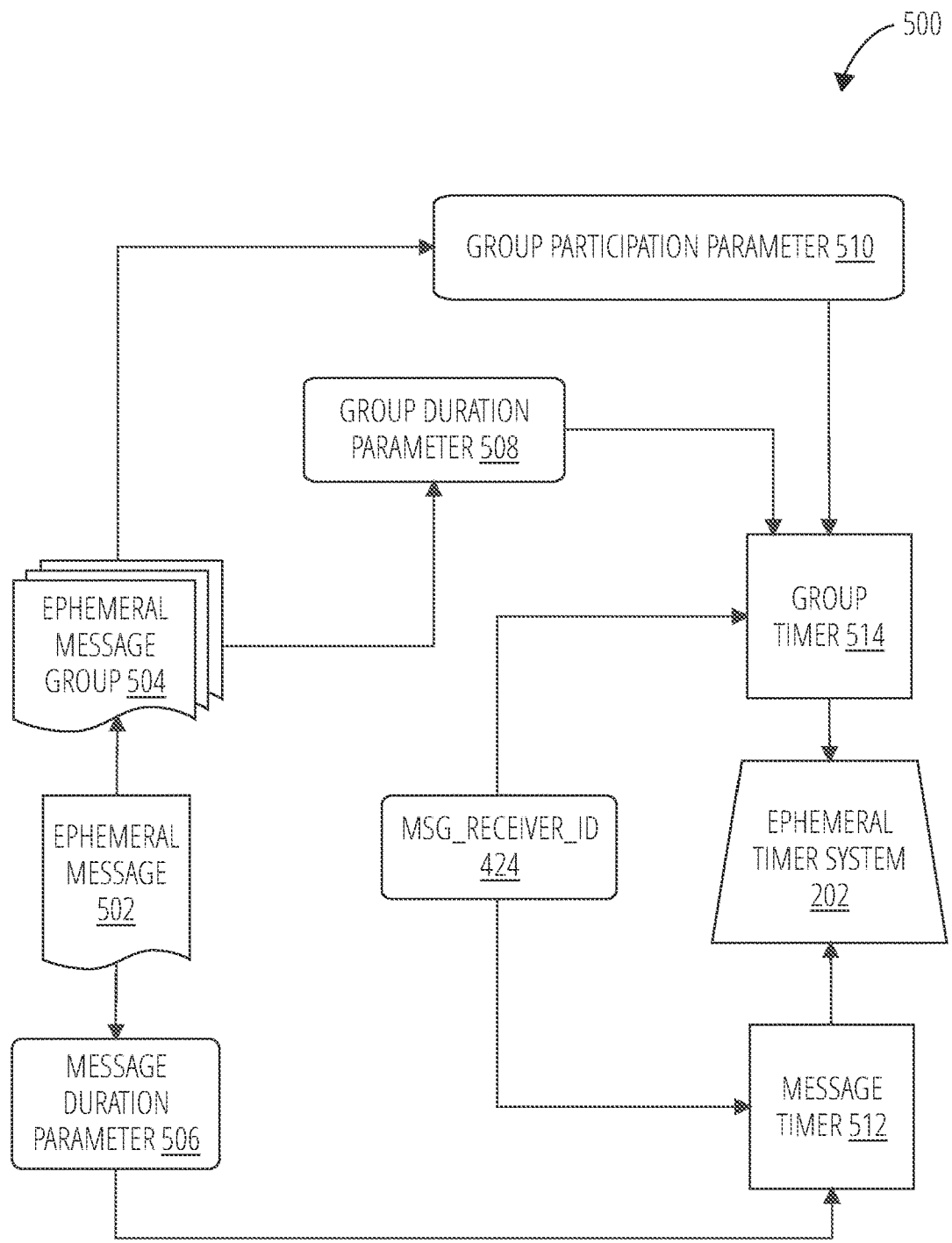
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal Story, or an event Story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a content collection pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514 which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
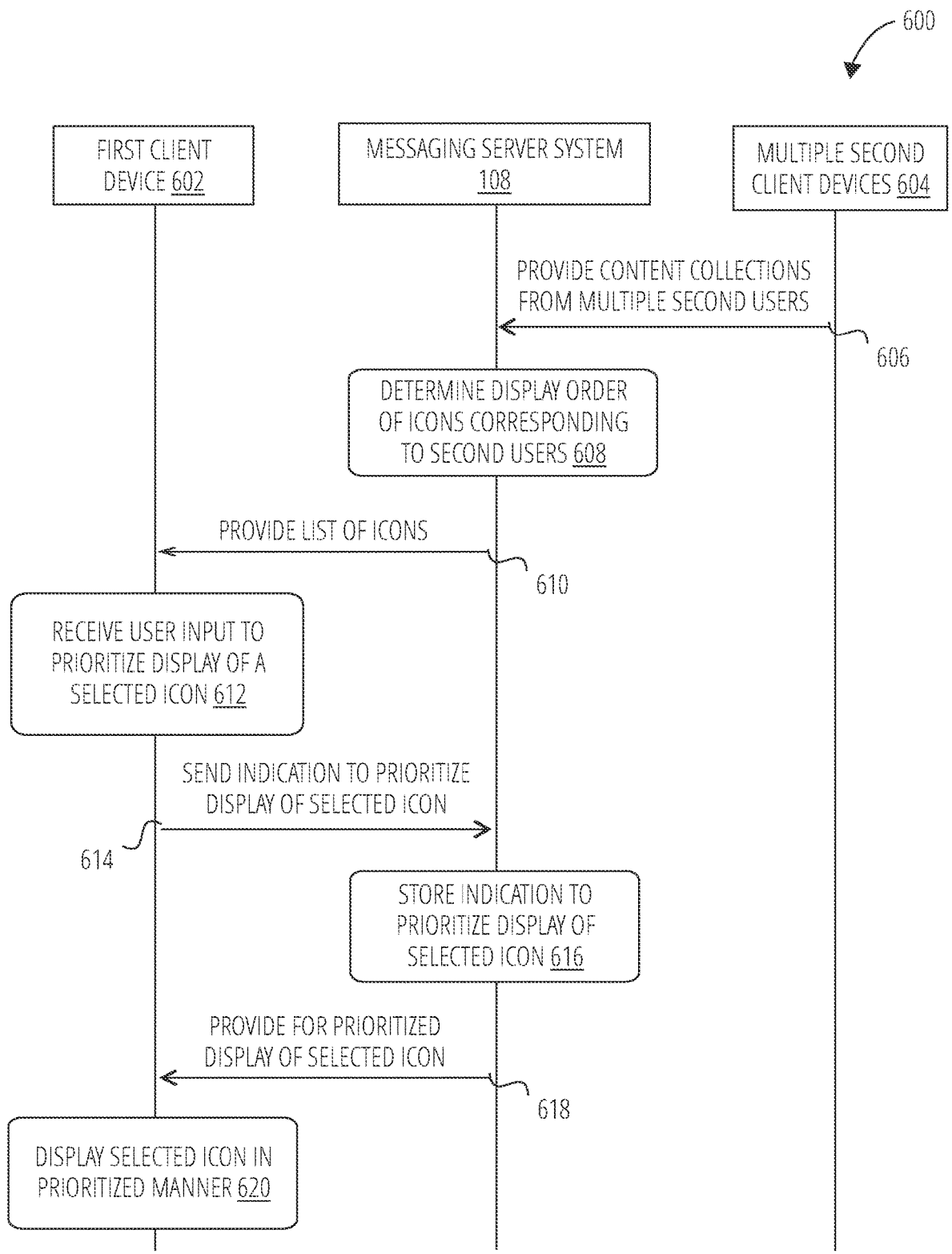
FIG. 6 is an interaction diagram illustrating a process for prioritizing display of an icon representing a user with available content, in accordance with some example embodiments.

FIG. 6 is an interaction diagram illustrating a process 600 for prioritizing display of an icon representing a user with available content, in accordance with some example embodiments. For explanatory purposes, the process 600 is primarily described herein with reference to a first client device 602 and multiple second client devices 604 (e.g., each of which may correspond to a respective client device 102), and with reference to the messaging server system 108. However, the process 600 is not limited to the first client device 602, the multiple second client devices 604 and the messaging server system 108. Moreover, one or more blocks (or operations) of the process 600 may be performed by one or more other components of the first client device 602, the multiple second client devices 604, the messaging server system 108, and/or by other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

Each of the first client device 602 and the multiple second client devices 604 may have instances of the messaging client application 104 installed thereon. The first client device 602 and the multiple second client devices 604 may be associated with a respective first user and multiple second users of the messaging server system 108. For example, the first user may be associated with a first user account of the messaging server system 108, and the second users may be associated with respective second user accounts of the messaging server system 108.

As noted above, the first user and the second users may be identified by the messaging server system 108 based on unique identifiers (e.g., a messaging system identifier, email address and/or a device identifier) associated with respective user accounts for the first user and the second users. In addition, the messaging server system 108 may implement and/or work in conjunction with a social network system 122, which is configured to identify the second users as contacts (e.g., friends) of the first user.

As shown in FIG. 6, the multiple second client devices 604 provide, or provide updates for, respective content collections (e.g., Stories) to the messaging server system 108 (operation 606). The multiple content collections may correspond to multiple second users who created the content collections, or otherwise added/contributed to content collections. A content collection (e.g., Story) corresponds to a collection of one or more content items (e.g., images, videos, audio files and any corresponding annotations(s)), and as noted above, may correspond to one or more of a personal Story, a live Story and/or a location Story. The content collections (e.g., Stories) allow for sending/broadcasting to at least the first user at the first client device 602.

The messaging client application 104 running on the first client device 602 is configured to display an interface (e.g., a stories feed interface) which includes a list of icons representing users (e.g., including the second users) with available content collections. The list of icons may be maintained by the messaging server system 108. For example, an icon comprises one or more of an image, avatar, video, emoji, label (e.g., text) and/or other representation for a respective second user. An icon indicates the identity of the respective second user and/or additional information (e.g., the availability of a Story update). In one example embodiment, the list of user icons is presented in a sorted, display order.

In response to receiving the content collections from the multiple second client devices 604, the messaging server system 108 determines a display order of the icons representing the second users (block 608). In one example embodiment, the display order is based on when a particular Story and/or update to a Story became available (e.g., when the Story content was uploaded to the messaging server system 108). For example, an icon corresponding to a more recently uploaded Story may be presented higher on the list relative to icons corresponding to other Stories.

Alternatively, or in addition, the display order is based on other parameters such as, but not limited to, a strength of the relationship (e.g., friendship) between the first user and the respective second user (e.g., relative to the other second users). For example, a stronger relationship may be determined based on the frequency and/or recency of messages exchanged between the first user and the respective second user. The messaging server system 108 may be configured to assign respective weights to one or more parameters in determining the display order of the icons.

The messaging server system 108 provides the list of icons, based on the display order, to the first client device 602 (operation 610). The first client device 602 displays the list of icons according to the display order and within an appropriate interface, such as a stories feed interface (discussed below with respect to FIGS. 7-8). In one example embodiment, the stories feed interface provides a user-selectable option for selecting an icon for prioritized display.

In the example of FIG. 6, the first client device 602 receives user input (e.g., via the user-selectable option) to prioritize display of a selected icon (block 612). For example, the user-selectable option may correspond to a pin option in which the first user pins the selected icon (e.g., corresponding to a respective second user) to indicate prioritized display thereof.

In response to receiving the user input, the first client device 602 sends an indication to prioritize display of the selected icon to the messaging server system 108 (operation 614). For example, the first client device 602 may send an indication that the selected icon has been pinned for prioritized display.

The messaging server system 108 receives the indication and stores the indication to prioritize display of the selected icon (block 616). The messaging server system 108 provides for the prioritized display of the selected icon on the first client device 602 (operation 618). For example, the messaging server system 108 sends an updated display order to the first client device 602, to cause the selected icon to be prioritized in the display of the first client device 602 according to the updated display order. In some embodiments, the updated display order corresponds to positioning the selected icon to be on top of the list. As noted above, the list of icons is arranged according to the display order maintained and provided by the messaging server system 108.

Moreover, by storing the indication of prioritized display, the messaging server system 108 may provide for persistently prioritizing the selected icon (e.g., between instantiations of the messaging client application 104 running on the first client device 602) to be on the top of the list. The first client device 602 displays the selected icon in the prioritized manner as provided by the messaging server system 108 (block 620). As discussed further below with respect to FIG. 10 and FIG. 11, it is possible for the prioritized display to additionally or alternatively correspond with pinning the selected icon (e.g., or other representation of the user) to a device lock screen and/or message preview.

Figure 7:
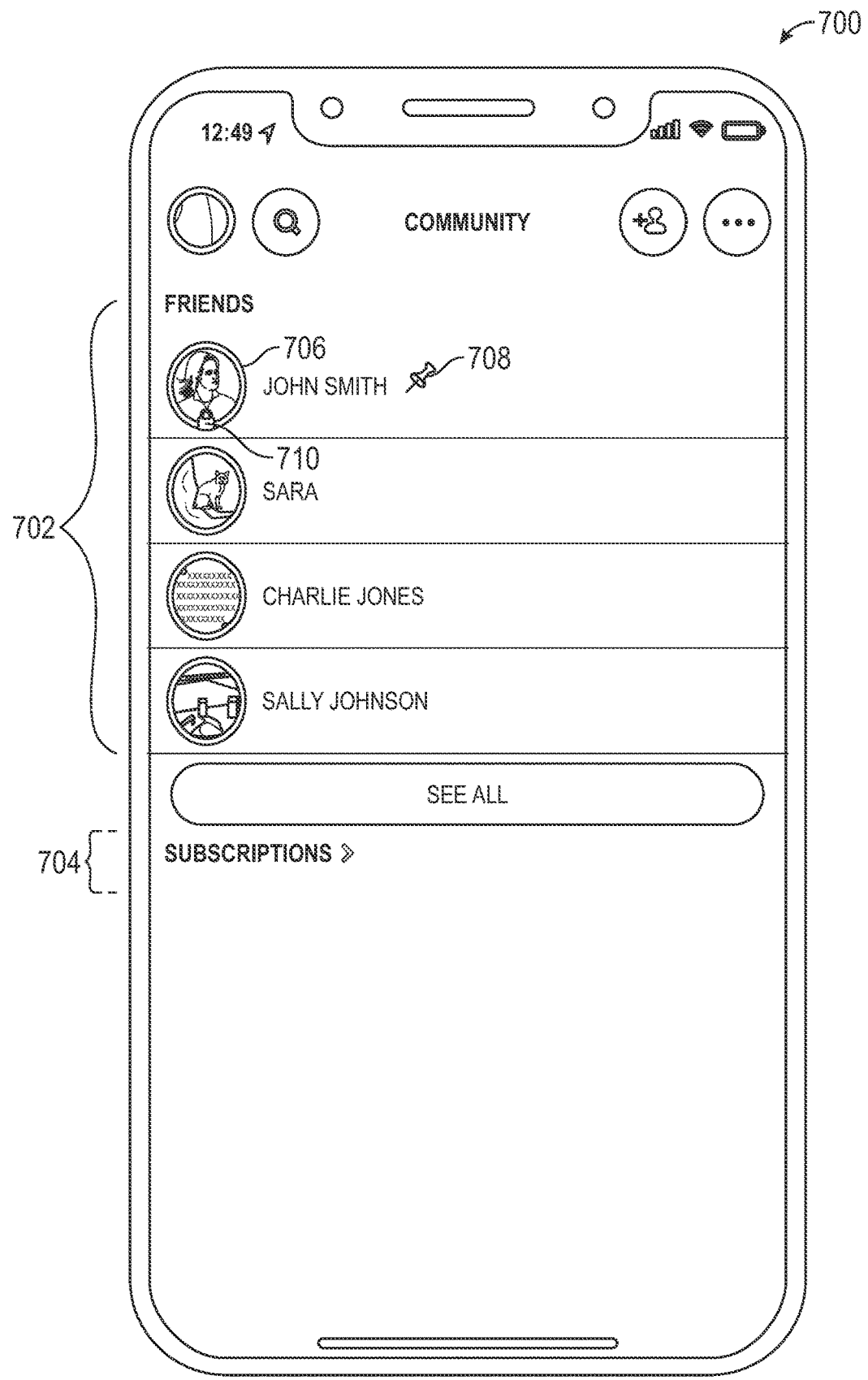
FIG. 7 illustrates a stories feed interface with prioritized display of a selected user, in accordance with some example embodiments.

FIG. 7 illustrates a stories feed interface 700 with prioritized display of a selected user, in accordance with some example embodiments. The stories feed interface 700 includes a friends list 702 with icons representing friends with available content collections (e.g., Stories). The stories feed interface further includes a subscription list 704 with icons (not shown) representing publishers (e.g., merchants, social media influencers, businesses, advertisers, and the like) with available content collections.

As noted above, the icons (e.g., image, avatar, video, emoji and/or label) representing friends with available content collections respectively identify each friend within the friends list 702 and/or provide additional information (e.g., the availability of a Story update) for each friend. Selection of a particular icon (and/or selection of the additional information) may provide for displaying the content collection associated with the corresponding friend. Further, the friends list 702 is arranged according to a display order, such as based on an upload time of the content collection or an indication of priority (e.g., via a pin) for one or more users.

In the example of FIG. 7, the selected icon 706 corresponds to a friend that was previously selected (e.g., pinned) for prioritized display. As such, the selected icon is displayed at the top of the friends list 702 and/or may be displayed with a pin element 708.

Prior to being selected, the selected icon 706 may have appeared further down the friends list 702. In one example embodiment, the end user (e.g., the first user) selects the selected icon 706 by performing a press-and-hold gesture (e.g., a long press) thereon, or other selection method. In response to the selection method, the messaging client application 104 presents a menu interface with a user-selectable button to prioritize display of (e.g., pin) the selected icon 706.

In one example embodiment, the menu interface further includes a user-selectable button to add the selected icon (e.g., or other representation of the user) to the device lock screen. In the example of FIG. 7, the lock screen element 710 indicates that the friend corresponding to the selected icon 706 has also been pinned to the device lock screen (e.g., as discussed further below with respect to FIG. 10). The menu interface further provides for enabling/disabling the prioritized display option and/or device lock screen option.

Figure 8:
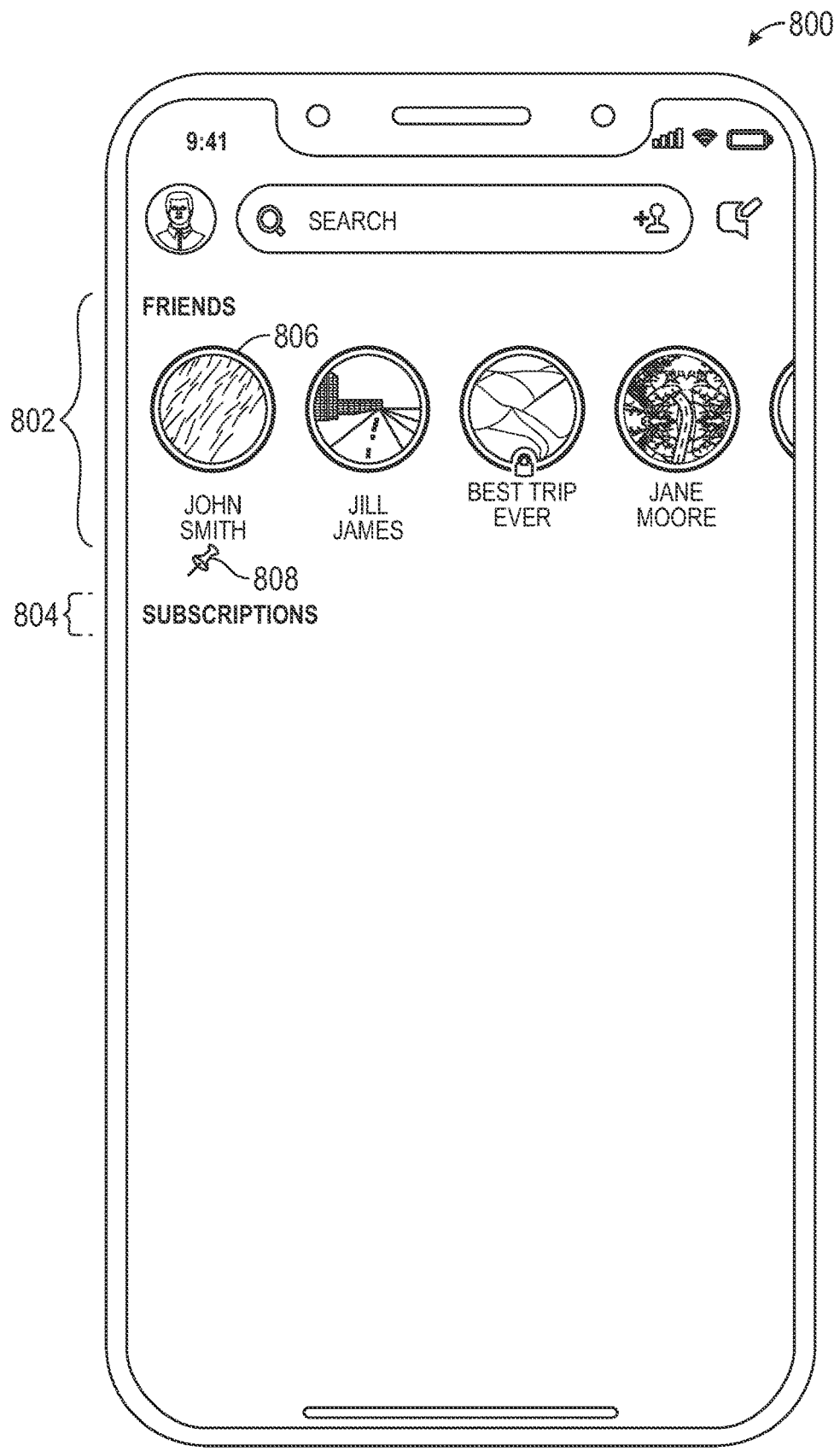
FIG. 8 illustrates another stories feed interface with prioritized display of a selected user, in accordance with some example embodiments.

FIG. 8 illustrates another stories feed interface 800 with prioritized display of a selected user, in accordance with some example embodiments. The stories feed interface 800 of FIG. 8 displays a friends list 802 in a horizontal arrangement, instead of the vertical arrangement of the friends list 702 shown in FIG. 7. Similar to FIG. 7, the friends list 802 is displayed according to a display order, with a selected icon 806 corresponding to a friend that was previously selected (e.g., pinned, via the pin element 808) for prioritized display. While not shown in FIG. 8, the stories feed interface 800 may further provide for pinning the selected icon 806 on the device lock screen, and displaying a corresponding lock screen element. The stories feed interface 800 further includes a subscriptions list 804 with icons (not shown) displayed in a horizontal manner.

Figure 9:
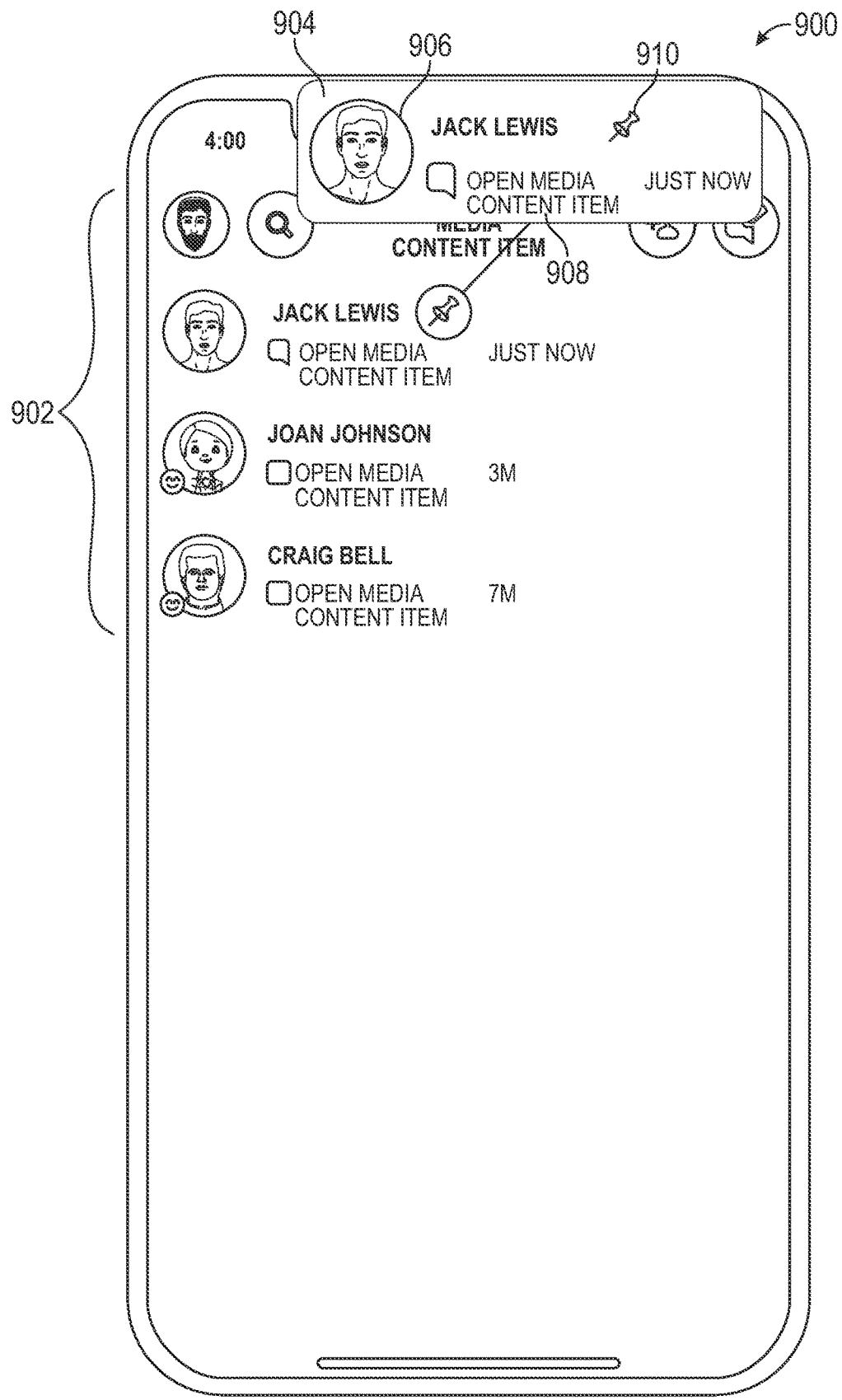
FIG. 9 illustrates a friends feed interface with prioritized display of a selected user, in accordance with some example embodiments.

FIG. 9 illustrates a friends feed interface 900 with prioritized display of a selected user, in accordance with some example embodiments. In addition to displaying stories feed interface(s) (e.g., the stories feed interface 700, the stories feed interface 800), the messaging client application 104 running on a client device 102 may provide for display of the friends feed interface 900.

The friends feed interface 900 includes a friends list 902 for a particular user (e.g., the first user). For each listed friend, the friends list 902 includes a name, icon (e.g., avatar) and status for that friend. For example, the respective statuses may indicate one or more of available messages for viewing, status updates, and the like. Selection of a particular icon (and/or selection of the additional information) may provide for displaying the content (e.g., message) or status associated with the corresponding friend.

The messaging server system 108 provides for arranging the friends list 902 according to a display order, as explained above. In one example embodiment, the display order is based on a strength of the relationship (e.g., friendship) between the listed friend and the first user. For example, a stronger relationship may be determined based on the frequency and/or recency of messages exchanged between the listed friend and the first user. Alternatively, or in addition, the strength of the relationship may be based on a user-specified strength (e.g., where the first user had previously identified closest or "best" friends within the messaging client application 104).

In the example of FIG. 9, an expanded cell 904 shows an expanded view for a particular user. As seen, the expanded cell 904 includes a selected icon 906, a status 908 (e.g., indicating message content) and a pin element 910. Similar to the examples of FIG. 7 and FIG. 8, the selected icon 906 may correspond to a friend that was previously selected (e.g., pinned, as shown by the pin element 910) for prioritized display. The selected icon 906 may have been previously selected based on a press-and-hold gesture (e.g., a long press) within a menu interface (not shown). The menu interface may have included options to enable/disable prioritized display and/or display on a lock screen for the selected icon 906.

Thus, as shown in the examples of FIGS. 7-9, the messaging system 100 provides for prioritized display of a selected icon (e.g., representing a particular user) within a stories feed interface and/or a friends feed interface. Moreover, the stories feed interface and/or the friend feed interface may include a user-selectable option to add the selected icon (e.g., or other representation of the user) to a device lock screen (e.g., as discussed further below with respect to FIG. 10).

Figure 10:
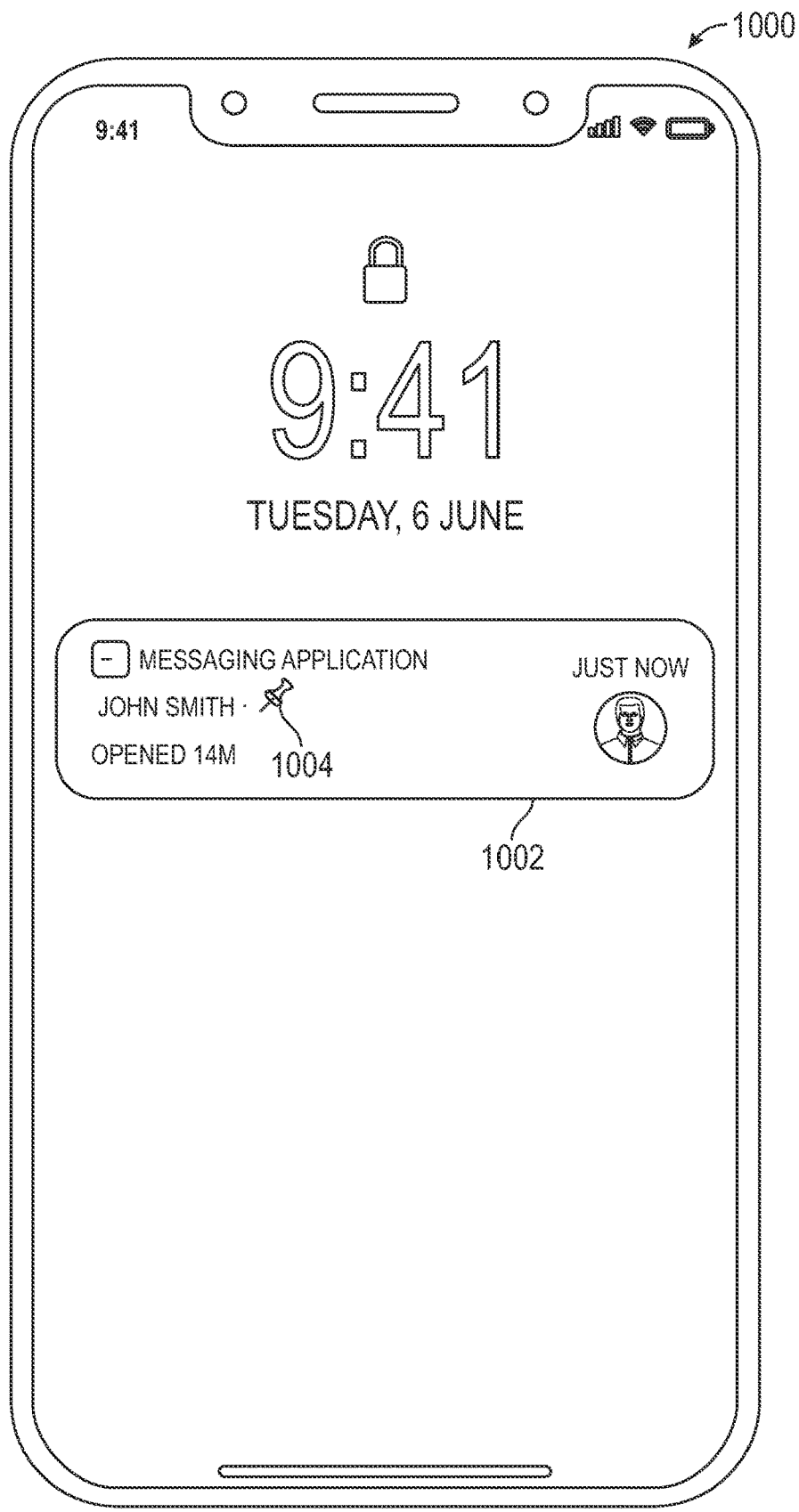
FIG. 10 illustrates a lock screen interface which includes a representation of a user selected for prioritized display, in accordance with some example embodiments.

FIG. 10 illustrates a lock screen interface 1000 which includes a representation of a user selected for prioritized display, in accordance with some example embodiments. The lock screen interface 1000 corresponds to a device lock screen provided by an operating system of the client device 102. For example, a device lock screen may provide for immediate or otherwise expedited access to the client device 102, by requiring that the user perform a certain action in order to receive access (e.g., entering a password, using a certain button combination, or performing a certain gesture).

In the example of FIG. 10, the lock screen interface 1000 includes a notification 1002 of a user selected for prioritized display. The notification 1002 includes an icon (e.g., avatar) of the user, a name of the user, and/or a name of the messaging client application 104. Moreover, the notification 1002 includes a pin element 1004 indicating that the selected user had previously been pinned for display on the device lock screen (e.g., as discussed above).

The notification 1002 may correspond to a user-selectable link, the selection of which provides for displaying the friendship profile (or group profile) associated with the user, for example, to access message content and/or content collection(s) (e.g., Stories). Alternatively, or in addition, selection of the notification 1002 provides for directly navigating to a message thread (e.g., if the user had been pinned via the friends feed interface) and/or content collection (e.g., if the user had been pinned via the stories feed interface). Thus, the notification 1002 provides for more efficient and prioritized access to contend associated with the user. In some embodiments, access to such content first requires the user to perform the above-noted certain action (e.g., password, button combination, gesture).

In some embodiments, the notification 1002 is displayed on the lock screen interface 1000 on a persistent basis. For example, the persistent display may be implemented based on a persistent push notification which includes the information icon, name of user, name of messaging client application 104) of the notification 1002. The persistent push notification corresponds to a notification which is persistently pushed (e.g., based on a predefined frequency) from the messaging server system 108 to the client device 102. The operating system of the client device 102 may be configured to detect the persistently-pushed notification(s) for display on the lock screen, such that the notification 1002 is continuously displayed on the lock screen interface 1000.

Figure 11:
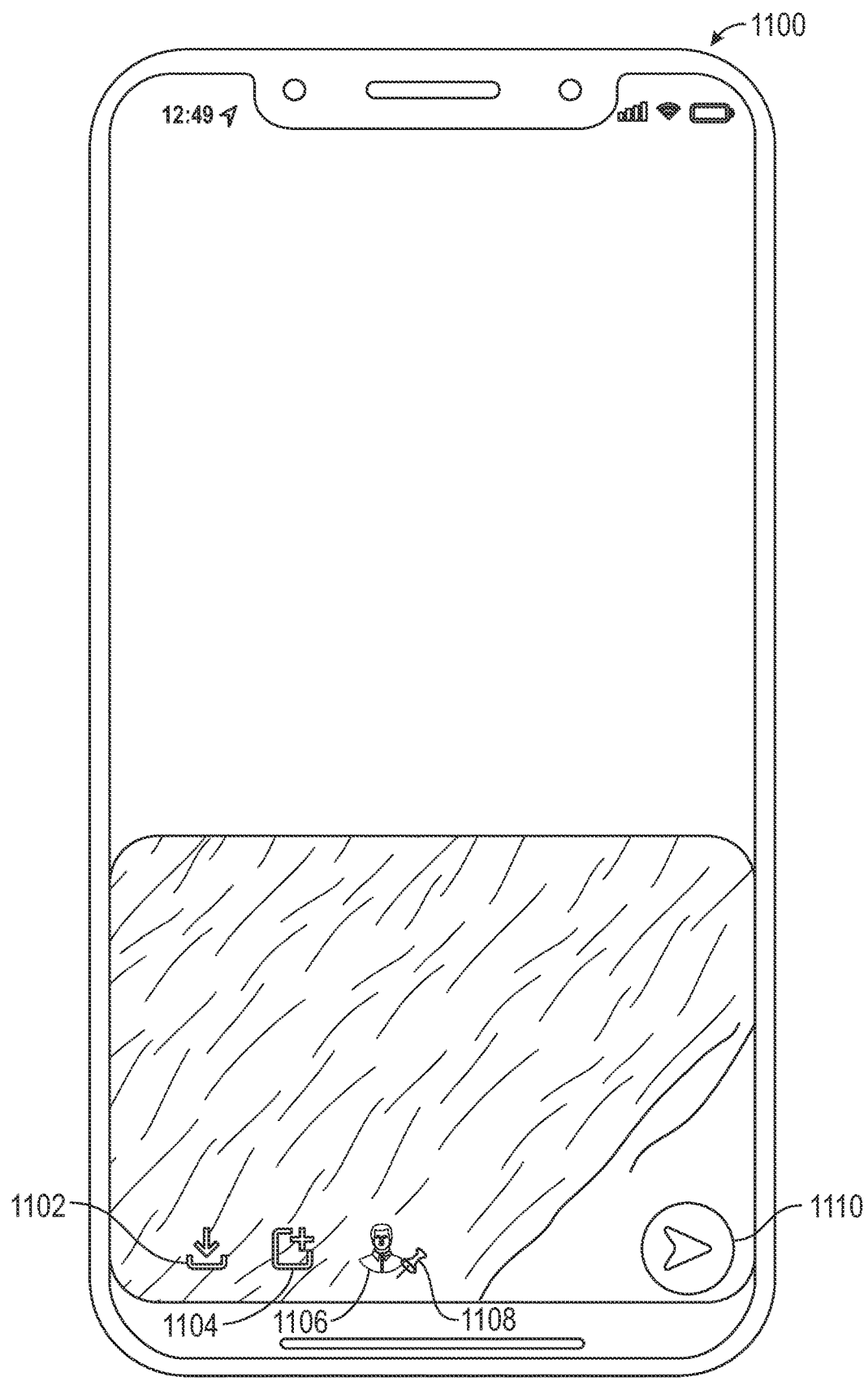
FIG. 11 illustrates a message preview interface which includes an icon representing a user selected for prioritized display, in accordance with some example embodiments.

FIG. 11 illustrates a message preview interface 1100 which includes an icon representing a user selected for prioritized display, in accordance with some example embodiments. The message preview interface 1100 includes interface elements for generating a message, storing the generated message (e.g., locally on the device, or remotely on the messaging server system 108) and/or sending the generated message. More specifically, the local save button 1102 may provide for locally-saving the generated message, the remote save button 1104 may provide for remotely-saving the generated message, and the send button 1110 may provide for sending the generated message to user-selected contacts (e.g., selected from a list of contacts/friends).

The message preview interface 1100 may further include a selected icon 1106, corresponding to a user that was previously selected (e.g., pinned, as shown by the pin element 1108) for prioritized display. For example, the menu interfaces described above with respect to FIGS. 7-9 may further provide for a user-selectable option to pin a selected user within the message preview interface 1100. User selection of the selected icon 1106 causes the generated message to be sent to the user corresponding to the selected icon 1106 (e.g., as opposed to requiring selection of the friend from a friend list within a separate interface), for more efficient and prioritized sending of message content with respect to the selected user.

Figure 12:
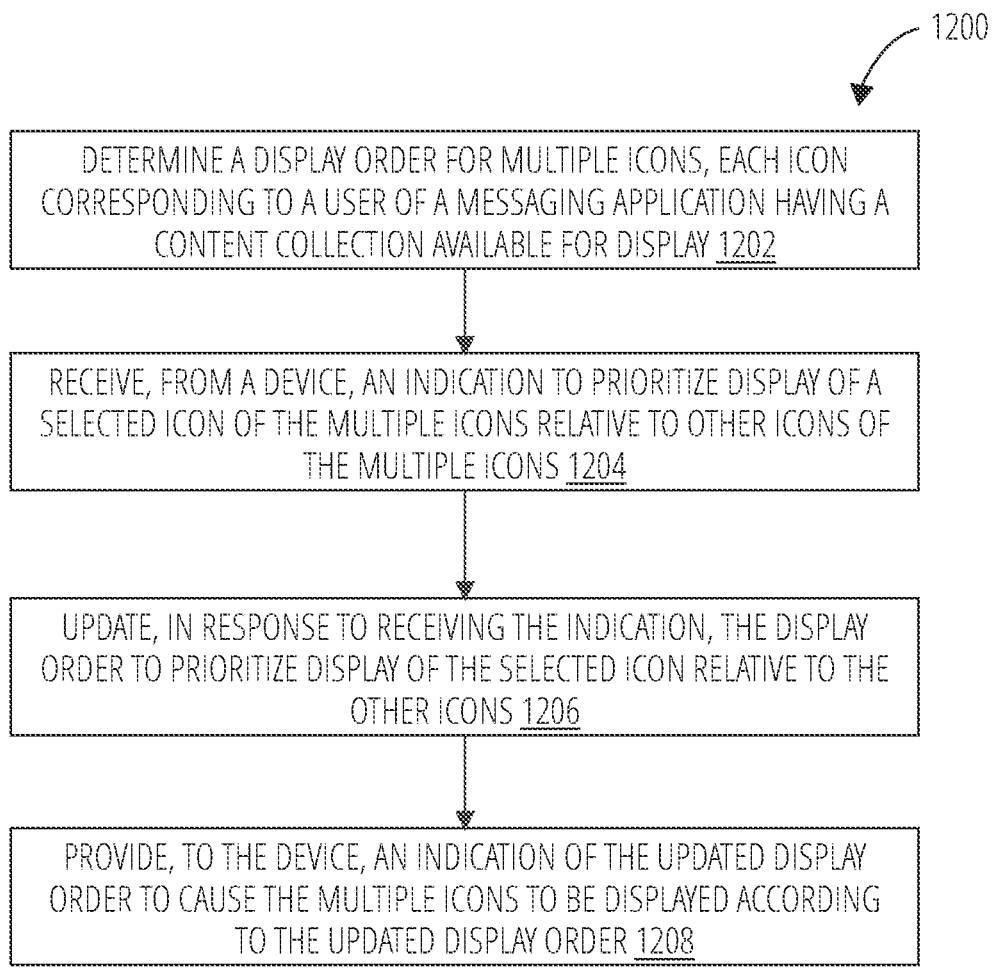
FIG. 12 is a flowchart illustrating a process for prioritizing display of an icon representing a user with available content, in accordance with some example embodiments.

FIG. 12 is a flowchart illustrating a process 1200 for prioritizing display of an icon representing a user with available content, in accordance with some example embodiments. For explanatory purposes, the process 1200 is primarily described herein with reference to the messaging server system 108 of FIG. 1. However, one or more blocks (or operations) of the process 1200 may be performed by one or more other components of the messaging server system 108, and/or by other suitable devices. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

The messaging server system 108 determines a display order for multiple icons, each icon corresponding to a user of a messaging application having a content collection available for display (block 1202). Each user may correspond to a contact within the messaging application. The content collection for each user may include a collection of media data.

The display order may correspond to a stories feed interface of the messaging application, the stories feed interface being separate from a friends feed interface of the messaging application. The display order may be based at least in part on a time at which each content collection was made available by the respective user (e.g., uploaded to the messaging server system 108).

The messaging server system 108 receives, from the client device 102, an indication to prioritize display of a selected icon of the multiple icons relative to other icons of the multiple icons (block 1204). The messaging server system 108 updates, in response to receiving the indication, the display order to prioritize display of the selected icon relative to the other icons (block 1206).

The messaging server system 108 may store the indication to prioritize display of the selected icon, such that the prioritized display of the selected icon persists between instantiations of the messaging application.

The messaging server system 108 provides, to the client device 102, an indication of the updated display order to cause the multiple icons to be displayed according to the updated display order (block 1208). The messaging server system 108 may display a link associated with the selected icon on a device lock screen. Displaying the link on the device lock screen may include providing a persistent push notification comprising the link, to enable persistent display of the link on the device lock screen.

Figure 13:
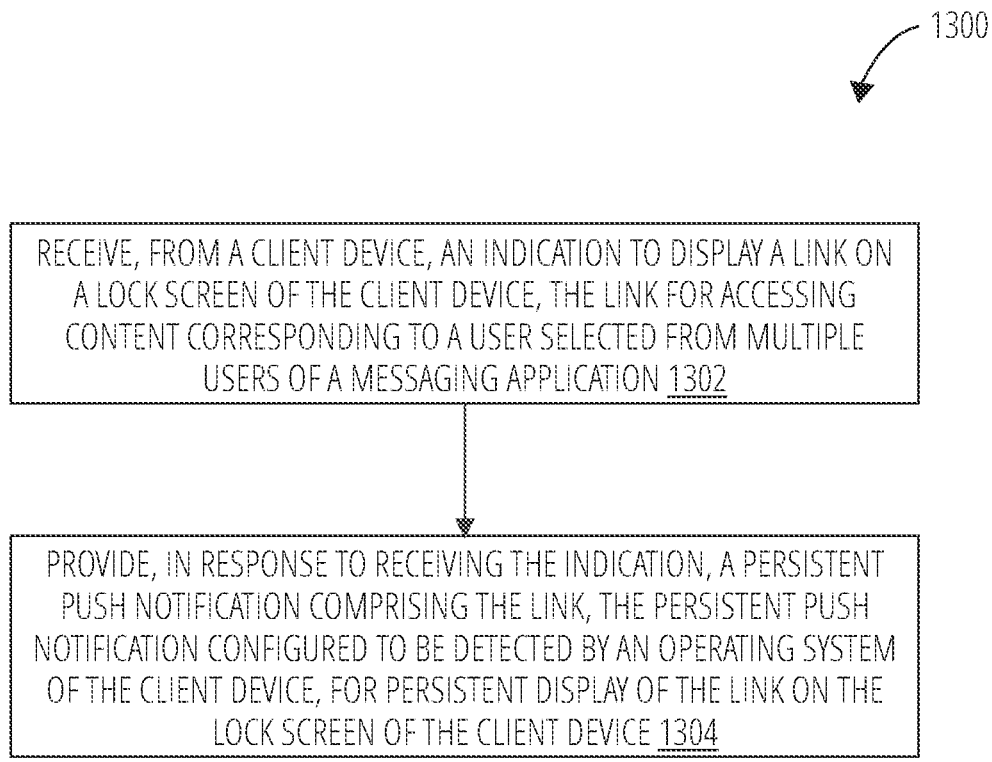
FIG. 13 is a flowchart illustrating a process for displaying an icon on a lock screen, the icon representing a user selected for prioritized display, in accordance with some example embodiments.

FIG. 13 is a flowchart illustrating a process 1300 for displaying an icon on a lock screen, the icon representing a user selected icon for prioritized display, in accordance with some example embodiments. For explanatory purposes, the process 1300 is primarily described herein with reference to the messaging server system 108 of FIG. 1. However, one or more blocks (or operations) of the process 1300 may be performed by one or more other components of the messaging server system 108, and/or by other suitable devices. Further for explanatory purposes, the blocks of the process 1300 are described herein as occurring in serial, or linearly. However, multiple blocks of the process 1300 may occur in parallel. In addition, the blocks of the 1300 need not be performed in the order shown and/or one or more blocks of the process 1300 need not be performed and/or can be replaced by other operations.

The messaging server system 108 receives, from the client device 102, an indication to display a link on a lock screen of the client device 102, the link for accessing content corresponding to a user selected from multiple users of a messaging application (block 1302).

In one example embodiment, the user is selected from the multiple users based on a friends feed interface provided on the client device 102. Alternatively, or in addition, the user is selected from the multiple users based on a stories feed interface provided on the client device 102.

The messaging server system 108 provides to the client device 102, in response to receiving the indication, a persistent push notification comprising the link. The persistent push notification is configured to be detected by an operating system of the client device 102, to enable persistent display of the link on the lock screen of the client device 102 (block 1304). In this way, the next time the lock screen is enabled, the push notification comprising the link is displayed on the lock screen of the client device.

Figure 14:
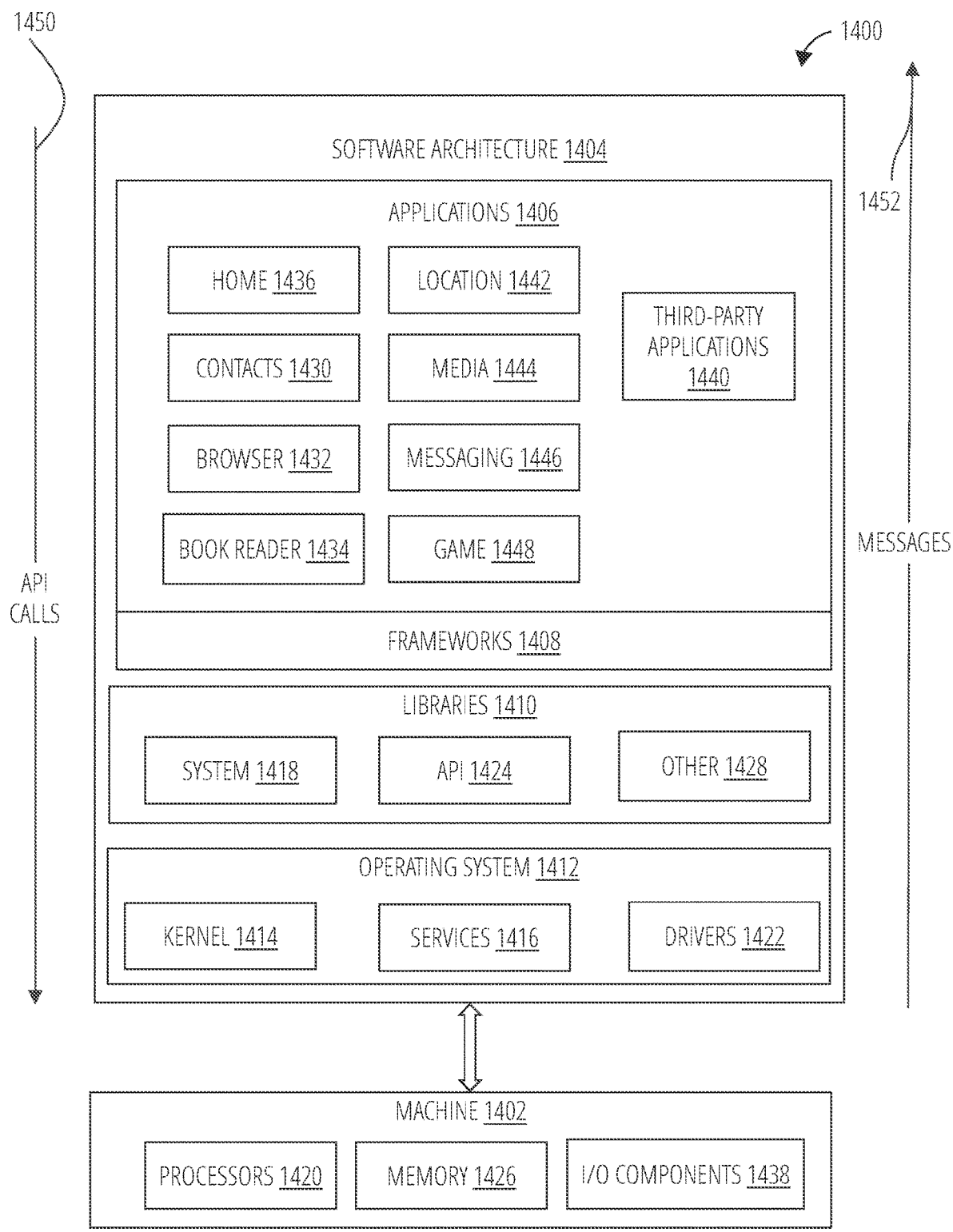
FIG. 14 is block diagram showing a software architecture within which the present disclosure may be implemented, in accordance with some example embodiments.

FIG. 14 is a block diagram 1400 illustrating a software architecture 1404, which can be installed on any one or more of the devices described herein. The software architecture 1404 is supported by hardware such as a machine 1402 that includes processors 1420, memory 1426, and I/O components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450 through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, processor management (e.g., scheduling), component management, networking, and security settings, among other functionality. The services 1416 can provide other common services for the other software layers. The drivers 1422 are responsible for controlling or interfacing with the underlying hardware. For instance, the drivers 1422 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1410 provide a low-level common infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a high-level common infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In an example embodiment, the applications 1406 may include a home application 1436, a contacts application 1430, a browser application 1432, a book reader application 1434, a location application 1442, a media application 1444, a messaging application 1446 (e.g., corresponding to the messaging client application 104), a game application 1448, and a broad assortment of other applications such as third-party applications 1440. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In a specific example, the third-party applications 1440 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1440 can invoke the API calls 1450 provided by the operating system 1412 to facilitate functionality described herein.

Figure 15:
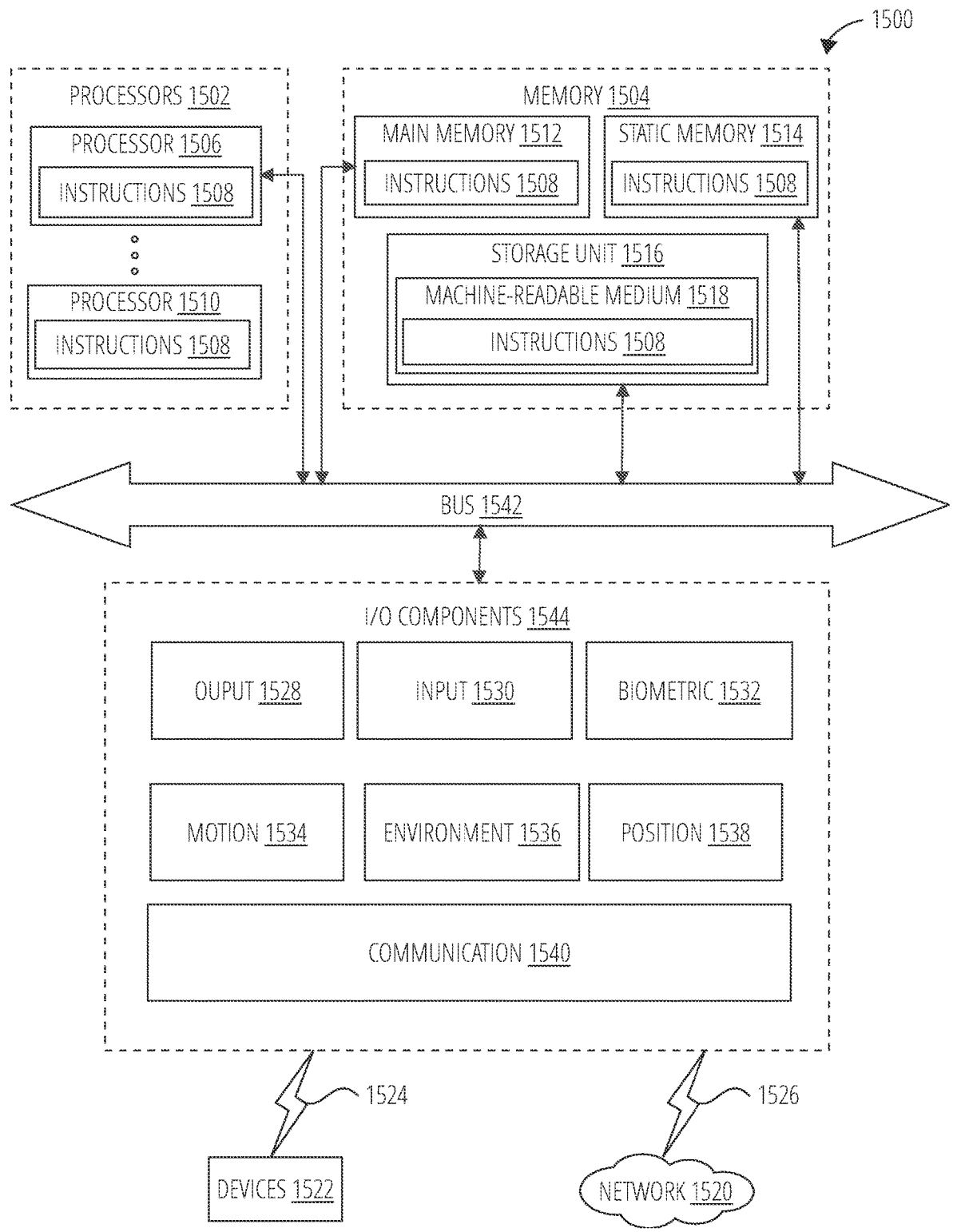
FIG. 15 is a diagrammatic representation of a machine, in the form of a computer system within which a set of instructions may be executed for causing the machine to perform any one or more of the methodologies discussed, in accordance with some example embodiments.

FIG. 15 is a diagrammatic representation of a machine 1500 within which instructions 1508 (e.g., software, a program, an application, an applet, an app, or other executable code) for causing the machine 1500 to perform any one or more of the methodologies discussed herein may be executed. For example, the instructions 1508 may cause the machine 1500 to execute any one or more of the methods described herein. The instructions 1508 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machines that individually or jointly execute the instructions 1508 to perform any one or more of the methodologies discussed herein.

The machine 1500 may include processors 1502, memory 1504, and I/O components 1544, which may be configured to communicate with each other via a bus 1542. In an example embodiment, the processors 1502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1506 and a processor 1510 that execute the instructions 1508. The term "processor" is intended to include multi-core processors that may comprise two or more independent processors (sometimes referred to as "cores") that may execute instructions contemporaneously. Although FIG. 15 shows multiple processors 1502, the machine 1500 may include a single processor with a single core, a single processor with multiple cores (e.g., a multi-core processor), multiple processors with a single core, multiple processors with multiples cores, or any combination thereof.

The memory 1504 includes a main memory 1512, a static memory 1514, and a storage unit 1516, both accessible to the processors 1502 via the bus 1542. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the processors 1502 (e.g., within the processor's cache memory), or any suitable combination thereof, during execution thereof by the machine 1500.

The I/O components 1544 may include a wide variety of components to receive input, provide output, produce output, transmit information, exchange information, capture measurements, and so on. The specific I/O components 1544 that are included in a particular machine will depend on the type of machine. For example, portable machines such as mobile phones may include a touch input device or other such input mechanisms, while a headless server machine will likely not include such a touch input device. It will be appreciated that the I/O components 1544 may include many other components that are not shown in FIG. 15. In various example embodiments, the I/O components 1544 may include output components 1528 and input components 1530. The output components 1528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1544 may include biometric components 1532, motion components 1534, environmental components 1536, or position components 1538, among a wide array of other components. For example, the biometric components 1532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 include acceleration sensor components (e.g., accelerometer), gravitation sensor components, rotation sensor components (e.g., gyroscope), and so forth. The environmental components 1536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1544 further include communication components 1540 operable to couple the machine 1500 to a network 1520 or devices 1522 via a coupling 1526 and a coupling 1524, respectively. For example, the communication components 1540 may include a network interface component or another suitable device to interface with the network 1520. In further examples, the communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1522 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi® signal triangulation, location via detecting an NFC beacon signal that may indicate a particular location, and so forth.

The various memories (e.g., memory 1504, main memory 1512, static memory 1514, and/or memory of the processors 1502) and/or storage unit 1516 may store one or more sets of instructions and data structures (e.g., software) embodying or used by any one or more of the methodologies or functions described herein. These instructions (e.g., the instructions 1508), when executed by processors 1502, cause various operations to implement the disclosed embodiments.

The instructions 1508 may be transmitted or received over the network 1520, using a transmission medium, via a network interface device (e.g., a network interface component included in the communication components 1540) and using any one of a number of well-known transfer protocols (e.g., hypertext transfer protocol (HTTP)). Similarly, the instructions 1508 may be transmitted or received using a transmission medium via the coupling 1524 (e.g., a peer-to-peer coupling) to the devices 1522.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
   determining a display order for multiple icons, each icon representing a different contact of a user with respect to a messaging application, each contact having a respective content collection available for display;
   receiving, from a device, an indication to prioritize display of a user-selected icon of the multiple icons relative to other icons of the multiple icons;
   updating, in response to receiving the indication, the display order to prioritize display of the user-selected icon relative to the other icons;
   providing, to the device, an indication of the updated display order to cause the multiple icons to be displayed according to the updated display order,
   wherein the multiple icons correspond to a stories feed interface for browsing available content collections with respect to the messaging application; and
   causing a link associated with the user-selected icon to be presented on a device lock screen, the link being user-selectable to navigate to the respective content collection corresponding to the user-selected icon.

2. The method of claim 1, wherein the display order corresponds to an order in which the multiple icons are displayed in a list, and
   wherein the updated display order corresponds to displaying the user-selected icon at a top of the list.

3. The method of claim 1, further comprising:
   displaying a link associated with the user-selected icon on a device lock screen.

4. The method of claim 1, wherein causing the link to be presented comprises providing a persistent push notification comprising the link, to enable persistent display of the link on the device lock screen.

5. The method of claim 1, wherein the display order is based at least in part on a time at which each content collection was made available by the respective contact.

6. The method of claim 1, further comprising:
   storing the indication to prioritize display of the user-selected icon, such that the prioritized display of the user-selected icon persists between instantiations of the messaging application.

7. The method of claim 1, wherein the content collection for each contact comprises a collection of media content items.

8. A system comprising:
   a processor; and
   a memory including instructions that, when executed by the processor, cause the processor to perform operations comprising:
   determining a display order for multiple icons, each icon representing a different contact of a user with respect to a messaging application, each contact having a respective content collection available for display;
   receiving, from a device, an indication to prioritize display of a user-selected icon of the multiple icons relative to other icons of the multiple icons;
   updating, in response to receiving the indication, the display order to prioritize display of the user-selected icon relative to the other icons;

providing, to the device, an indication of the updated display order to cause the multiple icons to be displayed according to the updated display order,
wherein the multiple icons correspond to a stories feed interface for browsing available content collections with respect to the messaging application; and
causing a link associated with the user-selected icon to be presented on a device lock screen, the link being user-selectable to navigate to the respective content collection corresponding to the user-selected icon.

9. The system of claim 8, wherein the display order corresponds to an order in which the multiple icons are displayed in a list, and
wherein the updated display order corresponds to displaying the user-selected icon at a top of the list.

10. The system of claim 8, the operations further comprising:
displaying a link associated with the user-selected icon on a device lock screen.

11. The system of claim 8, wherein causing the link to be presented comprises providing a persistent push notification comprising the link, to enable persistent display of the link on the device lock screen.

12. The system of claim 8, wherein the display order is based at least in part on a time at which each content collection was made available by the respective contact.

13. The system of claim 8, the operations further comprising:
storing the indication to prioritize display of the user-selected icon, such that the prioritized display of the user-selected icon persists between instantiations of the messaging application.

14. The system of claim 8, wherein the content collection for each contact comprises a collection of media content items.

15. A non-transitory computer-readable medium comprising instructions, which when executed by a computing device, cause the computing device to perform operations comprising:
determining a display order for multiple icons, each icon representing a different contact of a user with respect to a messaging application, each contact having a respective content collection available for display;
receiving, from a device, an indication to prioritize display of a user-selected icon of the multiple icons relative to other icons of the multiple icons;
updating, in response to receiving the indication, the display order to prioritize display of the user-selected icon relative to the other icons;
providing, to the device, an indication of the updated display order to cause the multiple icons to be displayed according to the updated display order,
wherein the multiple icons correspond to a stories feed interface for browsing available content collections with respect to the messaging application; and
causing a link associated with the user-selected icon to be presented on a device lock screen, the link being user-selectable to navigate to the respective content collection corresponding to the user-selected icon.

16. The non-transitory computer-readable medium of claim 15, wherein the display order corresponds to an order in which the multiple icons are displayed in a list, and
wherein the updated display order corresponds to displaying the user-selected icon at a top of the list.

17. The non-transitory computer-readable medium of claim 15, the operations further comprising:
displaying a link associated with the user-selected icon on a device lock screen.

18. The non-transitory computer-readable medium of claim 15, wherein causing the link to be presented comprises providing a persistent push notification comprising the link, to enable persistent display of the link on the device lock screen.

19. The non-transitory computer-readable medium of claim 15, wherein the display order is based at least in part on a time at which each content collection was made available by the respective contact.

20. The non-transitory computer-readable medium of claim 15, the operations further comprising:
storing the indication to prioritize display of the user-selected icon, such that the prioritized display of the user-selected icon persists between instantiations of the messaging application.

* * * * *